(12) United States Patent
Gupta

(10) Patent No.: US 9,397,993 B1
(45) Date of Patent: Jul. 19, 2016

(54) SYSTEM AND METHOD FOR ACCESSING MODULAR APPLICATIONS

(71) Applicant: Google Inc., Mountain View, CA (US)

(72) Inventor: Saurabh Gupta, Millburn, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/155,118

(22) Filed: Jan. 14, 2014

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ........................................ *H04L 63/08* (2013.01)

(58) Field of Classification Search
CPC ..... H04L 63/08; H04L 63/10; H04L 63/0428; H04W 12/06; H04W 12/08
USPC ............................................................ 726/3
See application file for complete search history.

(56) References Cited

U.S. PATENT DOCUMENTS

| | | | |
|---|---|---|---|
| 8,200,953 | B1 | 6/2012 | Parsons |
| 2011/0035677 | A1 | 2/2011 | Vitale et al. |
| 2011/0282968 | A1* | 11/2011 | Oliver ................... G06F 9/5072 709/217 |
| 2012/0265744 | A1 | 10/2012 | Berkowitz et al. |
| 2012/0297288 | A1* | 11/2012 | Mansouri .......... G06F 17/30893 715/234 |
| 2013/0124638 | A1 | 5/2013 | Barreto et al. |
| 2013/0185651 | A1 | 7/2013 | Wionzek et al. |
| 2013/0268302 | A1 | 10/2013 | Jayaram |
| 2013/0268480 | A1 | 10/2013 | Dorman |
| 2013/0304694 | A1 | 11/2013 | Barreto et al. |
| 2013/0311894 | A1 | 11/2013 | Rexer et al. |
| 2013/0346995 | A1 | 12/2013 | Jackson |

\* cited by examiner

*Primary Examiner* — Kambiz Zand
*Assistant Examiner* — Stephen Sanders
(74) *Attorney, Agent, or Firm* — Ropes & Gray LLP

(57) ABSTRACT

A method and system for providing modular application for use within a cloud-based file includes storing on a cloud computing service a link to a modular application configured to be used with a cloud-based file, receiving a request to access the link to the modular application, determining whether the request source is associated with the cloud computing service, and providing an option to access the requested modular application. The option can be for a trial of the modular application or to create a cloud-based file using the modular application.

16 Claims, 6 Drawing Sheets

SYSTEM AND METHOD FOR ACCESSING MODULAR APPLICATIONS

BACKGROUND

Cloud computing services allow users to create, edit, share, and collaborate on files that are stored on the cloud computing service. Users connect to the cloud computing service over a remote network such as the Internet. Files that may be stored on the cloud computing service include word processing documents, spreadsheets, presentations, images, audio files, video files, and many other types of documents and files. The cloud computing service also provides file editing applications for displaying and editing certain files. These applications are sent from the cloud computing service to a client computer and displayed on a web browser executing on the client computer. For example, a cloud computing service may send to a client computer a document editing application for displaying and editing word processing documents stored on the cloud computing service. For collaborative documents, the cloud computing service sends the application to each collaborator so that they can view and edit the document at the same time.

The cloud computing service may allow users to install various add-on applications that increase the functionality of the file editing applications. These add-on applications, or modular applications, are designed to work in conjunction with the file editing applications. Some examples of modular applications can allow a user to create a word cloud of words in a document, create a bibliography of sources used in the document, and create special types of charts in a spreadsheet document that cannot normally be created with the document editing application. Discovering such modular applications, however, can be complicated as they may be provided in several contexts or made available from various sources. In addition, if a user is not already using a cloud computing service to create files, the user may have no idea that modular applications are available for use with a cloud computing service, or how to use any modular applications.

SUMMARY

The systems and methods described herein provide ways to easily introduce a user to a modular application without having previously used the modular application or a cloud computing service. A method for providing modular applications for use within a cloud-based file may include storing, on a cloud computing service, a link to a modular application configured to be used with a collaborative document, receiving a request to access the link to the modular application, determining whether the request source is associated with the cloud computing service, and providing an option to access the requested modular application. The options can include to create a cloud-based file using the modular application or to start a trial of the requested modular application. An installation of an application for creating the cloud-based file may be activated. If the request source is determined to be associated with the cloud computing service, a user authentication procedure for the cloud computing service may be provided. If the request source is determined to not be associated with the cloud computing service, a user introduction to the cloud computing service may be provided. The links may be provided to a searchable database or an application store.

BRIEF DESCRIPTION OF THE DRAWINGS

The methods and systems may be better understood from the following illustrative description with reference to the following drawings in which.

DETAILED DESCRIPTION

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices.

Aspects of the systems and methods described herein relate to facilitating access to and installation of modular applications that may be used with a cloud computing service and a cloud based file, such as a collaborative document, on the cloud computing service. (The systems and methods described herein may also be applied to other types of applications and files provided using the cloud computing service.) A cloud computing service stores a number of collaborative files, each of which may be viewed and edited by multiple collaborators at the same time. The cloud computing service provides a file editing applications to each collaborator, the file editing application executing as a stand-alone application or executing on a web browser on each collaborator's client computer. The cloud computing service also stores a number of modular applications that add additional functionality to the file editing application. The cloud computing service may also provide links to third-party modular applications that may be used with file editing applications and other cloud computing service applications.

A collaborator may browse and search for modular applications, for example, from an application store, using an internet search engine, or other database. When the user finds the modular application, the user may select the modular application to access it and interact with it. Interactions with the modular application can be a trial, activating an installation, or the user can be provided an option to create a new file using the modular application and a file editing application using the cloud computing service.

Figure 1:
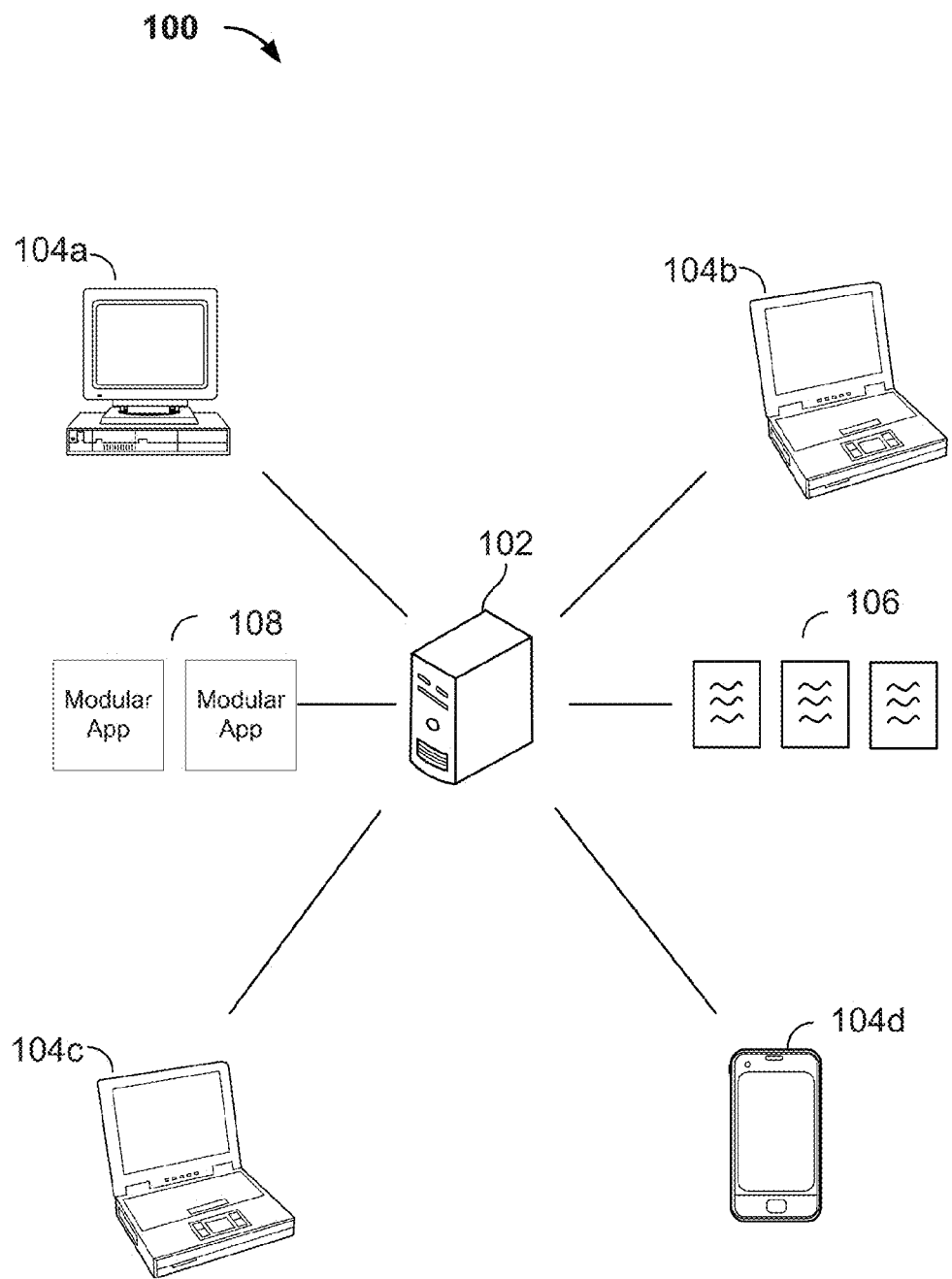
FIG. 1 shows a number of client computers in communication with a cloud computing service in accordance with an implementation as described herein.

First, a network system in which a number of client computers may connect to a server is described. FIG. 1 shows a network system 100 that includes cloud computing service 102 and a number of client computers 104a through 104d. Cloud computing service 102 may include one or more computing devices that collectively provide online content and services for a number of client computers. Cloud computing service stores a number of files 106 that are accessible by client computers 104a-104d. The files may include word processing documents, spreadsheets, presentations, images, audio files, video files, or any other files of various open or proprietary file types. Users may create, edit, copy, share, and delete files stored on the cloud computing service. Cloud computing service also stores a number of modular applications 108 or links to modular applications. Cloud computing service may also be connected to one or more third party services (not shown) that provide a modular application. Client computers 104a-104d may include desktop computers, laptop computers, tablets, smart phones, mobile electronic devices, or any other device that may connect to cloud computing service 102. System 100 may include many additional client computers not pictured in FIG. 1. The network connection between the client computers 104a-104d and cloud computing service 102 in network system 100 may be facilitated through a local area network, wide area network, Ethernet, fiber optic network, or any other wired or wireless connection.

Figure 2:
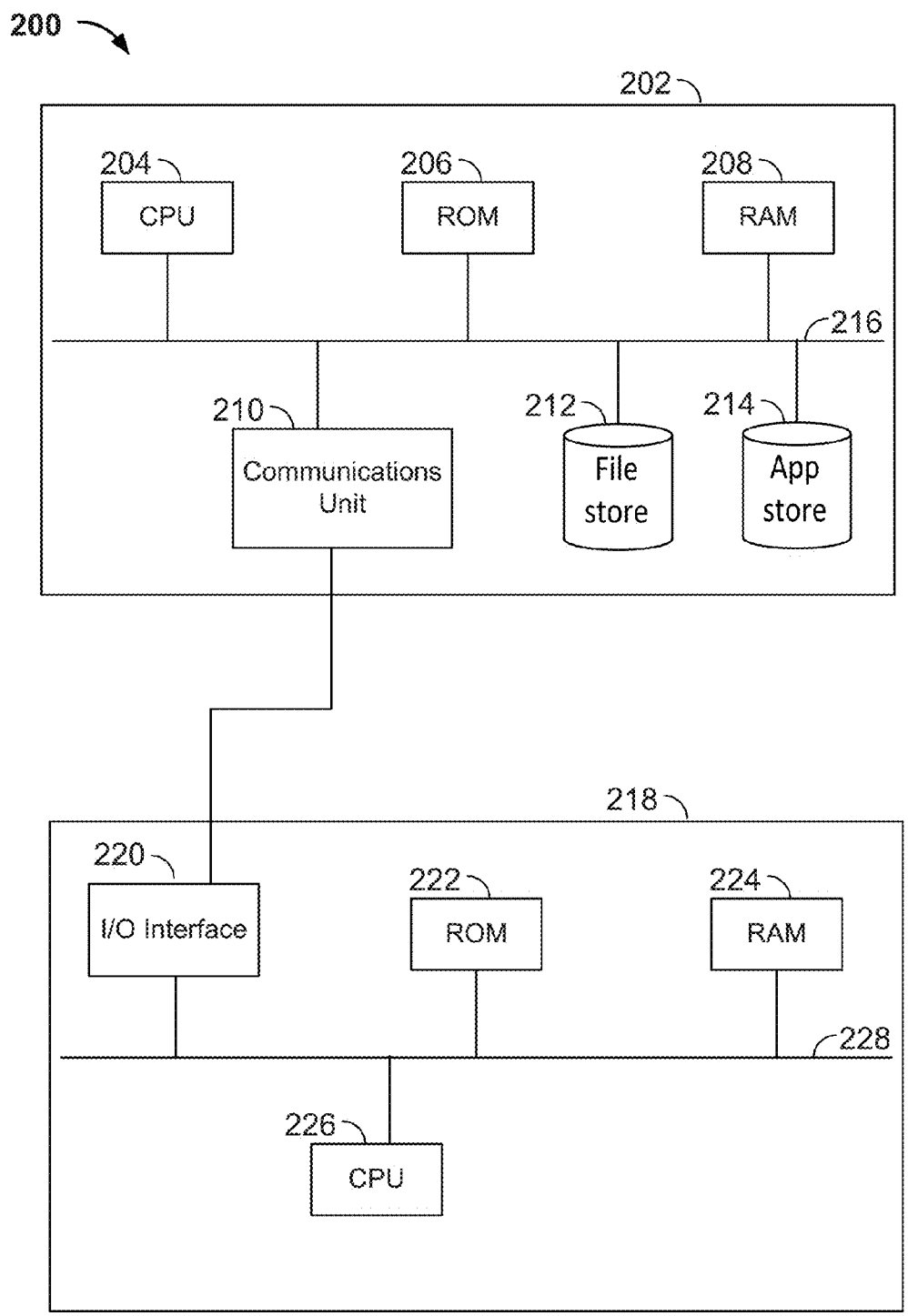
FIG. 2 shows the components of a cloud computing service in communication with a client computer in accordance with an implementation as described herein.

The components of a client computer and a cloud computing service in communication with each other are now described in more detail. System 200 in FIG. 2 includes a cloud computing service 202 in communication with a client computer 218. Cloud computing service 202 includes a central processing unit (CPU) 204, read-only memory (ROM) 206, random access memory (RAM) 208, communications unit 210, data store 212, application store 214, and bus 216. Server 202 may have additional components that are not illustrated in FIG. 2. Bus 216 allows the various components of server 202 to communicate with each other. Communications unit 210 allows server 202 to communicate with other devices, such as client computer 218 and other client computers. Data store 212 is used to store content accessible by a user on client computer 218, such as documents and files stored by users on cloud computing service 202. Application store 214 stores modular applications that are designed for use within the documents or files that are stored in data store 212. For example, application store 214 may store modular applications that are used in conjunction with document editing applications provided by cloud computing service 202 that allows users to edit documents on client computer 218. The modular applications are executed on cloud computing service 202 rather than installed and executed on client computer 218.

Client computer 218 includes a CPU 226, ROM 222, RAM 224, input/output interface 220, and bus 228. Client computer 218 may have additional components that are not illustrated in FIG. 2. Bus 228 allows the various components of client computer 218 to communicate with each other. Input/output interface 220 allows client computer 218 to communicate with other devices, such as cloud computing service 202. Input/output interface 220 also includes devices for taking in user inputs and displaying outputs to a user, such as a keyboard, mouse, and display screen. CPU 226 executes various programs and applications stored in memory on client computer 218, such as a web browser. Web browsers are used, among other things, to display content and services provided by cloud computing service 202. Web browsers receive web page documents encoded in HTML, CSS, Javascript, or other web-compatible languages and interpret the language to properly display the web page.

Data store 212 for storing content on cloud computing service 202, application store 214, a web browser executing on client computer 218, and other data structures and software programs in system 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and read-only, once-writable, or rewriteable optical disks (such as, e.g., CDROM, CDR, CD+R, CDRW, CD+RW, DVDROM, DVDR, DVD+R, DVDRW, and DVD+RW).

A cloud computing service stores files accessible to a number of users. Each user can view, edit, and share the files with other users. A collaborative file is a document stored on a cloud computing service that is accessible to multiple users and may be edited by one or more users at the same time. A cloud computing service provides a platform for collaborators to work on collaborative documents. The cloud computing service provides file editing applications for viewing and editing files stored on the cloud computing service. The file editing applications are sent from the cloud computing service to a client computer and run on a web browser or as a stand-alone application. The file editing applications include a user interface for displaying and editing the file. For example, if a user opens a word processing document stored on the cloud computing service, the cloud computing service sends a word processing document application to the web browser of the client computer. The word processing document application displays a user interface on the web browser for the user to view and edit the word processing document. The word processing document application may be implemented in HTML, Javascript, or any other browser-compatible language. Alternatively, the file editing application may be a stand-alone application that executes on the client computer, for example an "app" for a mobile device.

The cloud computing service may also store modular applications that work in conjunction with file editing applications and increase their functionality. These modular applications are provided by the cloud computing service, or can be provided by a third party service and linked to by the cloud computing service, and any user may install the modular applications and use them with and in files stored on the cloud computing service. Examples of modular applications for use in conjunction with cloud-based file editing applications include word cloud applications, mail merging applications, bibliography applications, chart and graph applications, plagiarism detection applications, document signature applications, facsimile applications, image editors, geography and mapping applications, and applications that retrieve information from the Internet to display within a file. When activated within a file editing application, some modular applications may alter the user interface of the file editing application to provide added functionality, while other modular applications may execute certain computations or routines to display a result, while yet others may operate in the background and do not produce a visual change in the display of the file or file editing application. The modular applications may be developed by the cloud computing service or by third-party developers. The cloud computing service may provide an online web page or in-product gallery where users can browse, search, and install the modular applications. The user interface of the file editing applications also provides menu options to browse, search, and install modular applications. The modular applications may be provided for free, or some of them may be available for a fee.

Modular applications may be installed on a client computer and may be used on that particular device. Modular applications may also be installed on a user basis and may be available on multiple devices. For example, a modular application provided by a cloud computing service may be available to the user of the cloud computing service. If a user wishes to find a modular application that may, for example, provide a needed feature, the user may search one or more sources. If the user, however, does not know about a cloud computing service, the user may not know to search for modular applications that are provided in connection with the cloud computing service. This may limit the user's ability to find and use modular applications.

The present systems and methods provide a more convenient way for users to use modular applications that are available in from a cloud computing service that the user has not previously used. Thus, a user with no history of using a cloud computing service can discover modular applications, interact with the modular application and create files using the modular application and the cloud computing service.

The modular applications may be developed by the cloud computing service or by third-party developers and may be written in Javascript or another browser compatible language. For example, a modular application may be written as a script in Javascript that communicates with the application programming interface (API) of the document editing application and provides additional functionality to the application. The modular application may add additional user interface elements to the display, such as menu options, tabs, or sidebars.

A user may search for a modular application using an internet search engine or application store. The search results may include links to relevant modular applications which may be selected to access the respective modular application. The cloud computing service may initiate and execute the modular application when it receives a request to access the modular application. If the cloud computing service detects that the request comes from a user of the cloud computing service, the cloud computing service may lead the user to a cloud system interface that allows the user to select files or create files for use with the selected modular application. The cloud computing service may also detect that the source of the request is not associated with the cloud computing service and in that case may provide a page with information about the modular application and options for interacting with the modular application, for example, to try the modular application, install the application, or to create a cloud-based file using the modular application. In creating the cloud-based file, the cloud computing service would provide the user with the opportunity to sign up for the cloud computing service, and create a user profile.

Figure 3:
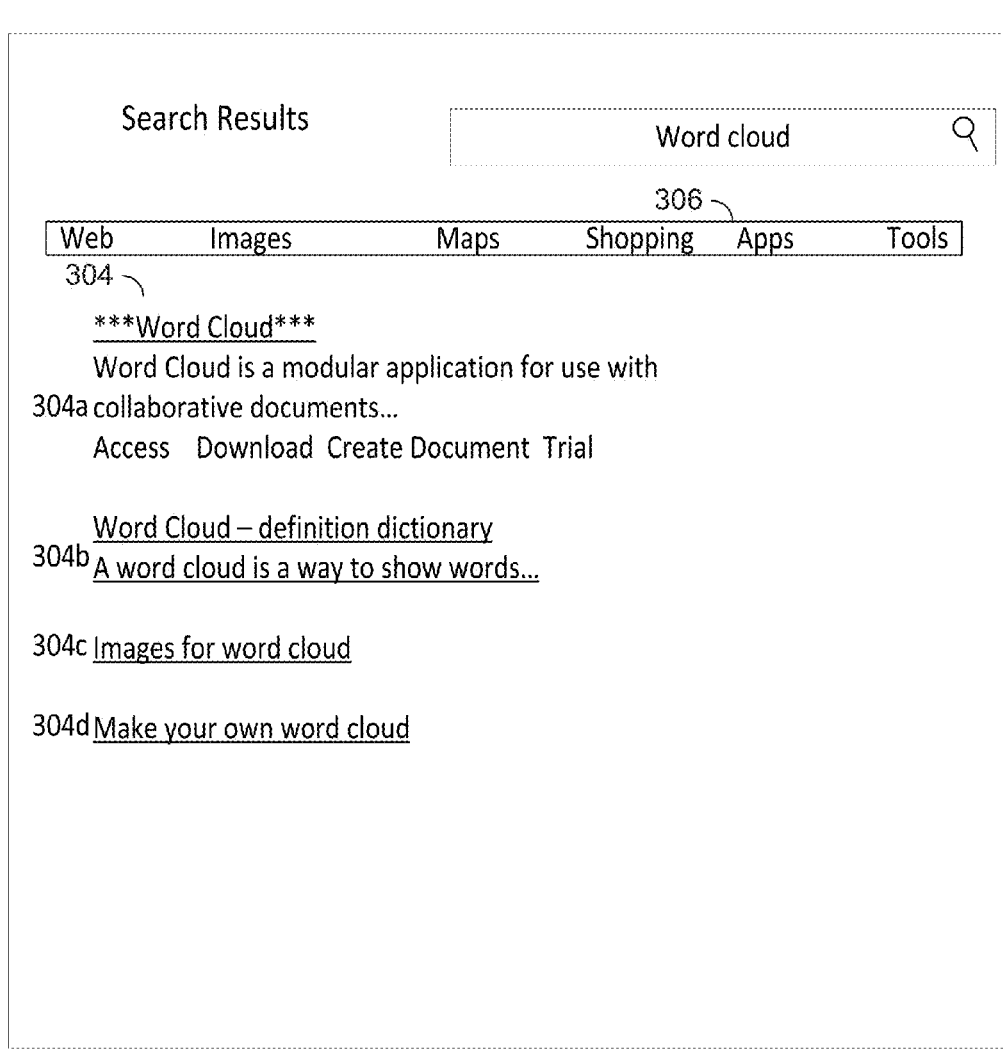
FIG. 3 shows a user interface for a list of search results for a modular application in accordance with an implementation as described herein.

FIG. 3 shows a search interface 300, which may be provided by a typical internet search engine, application store, or a cloud computing service. The interface 300 may be implemented in Javascript, Java, HTML, CSS, or any other browser-compatible language. The design and layout of user interface 300 is not limited to what is illustrated in FIG. 3. As shown in FIG. 3, a user has searched for a word cloud. In the search results 304 multiple links 304a-d are shown that include different types of results. For users that have not used a cloud computing service, providing search results of different types, and that link to the cloud computing service, is helpful for introducing the user to modular applications provided by an unknown cloud computing service. As shown in FIG. 3, the first result 304a is for "Word Cloud" a modular application. This first result 304a is shown in bold with asterisks to highlight that it is a modular application. Of course other types of images, designs, and icons may be used to signify that it is a particular kind of result link—in this case, a modular application. Other results shown in the search interface include a dictionary definition 304b, images 304c, and making your own word cloud 304d. The modular application result may be included in a general search, or may be obtained by refining the search to only include applications, for example, using toolbar item 306. Options may be provided for a modular application link that are not provided for other types of result links. For example, as shown, the word cloud modular application 304a may include an option to access the modular application, download the modular application, create document using the modular application, and a trial. Selecting the search result link 304a may cause a user to access a start page for the modular application. Selecting one of the options for the modular application from the search results may cause the user to skip the start page and proceed to, for example, access the modular application, a download interface, create a new document on the cloud computing service or an application trial, as appropriate given the user's selection.

When a user selects a modular application search result link 304a shown in FIG. 3, the user may be provided with the options shown with the search result link 304a, or a screen requesting consent from the user to allow the modular application permission to certain user data. Obtaining such information allows the cloud computing service to detect whether the user is already associated with the cloud computing service. If the user refuses the user data access request, the cloud computing service may treat the user as a non-subscriber and provide options to the user as if the user has never used the cloud computing service. Any cloud computing service interface could also include a link to log in to the service. If the user allows the cloud computing service to access user data and the cloud computing service determines that the user is not associated with the cloud computing service, the cloud computing service will provide the user with options to interact with the modular application, as well as the cloud computing service.

Figure 4:
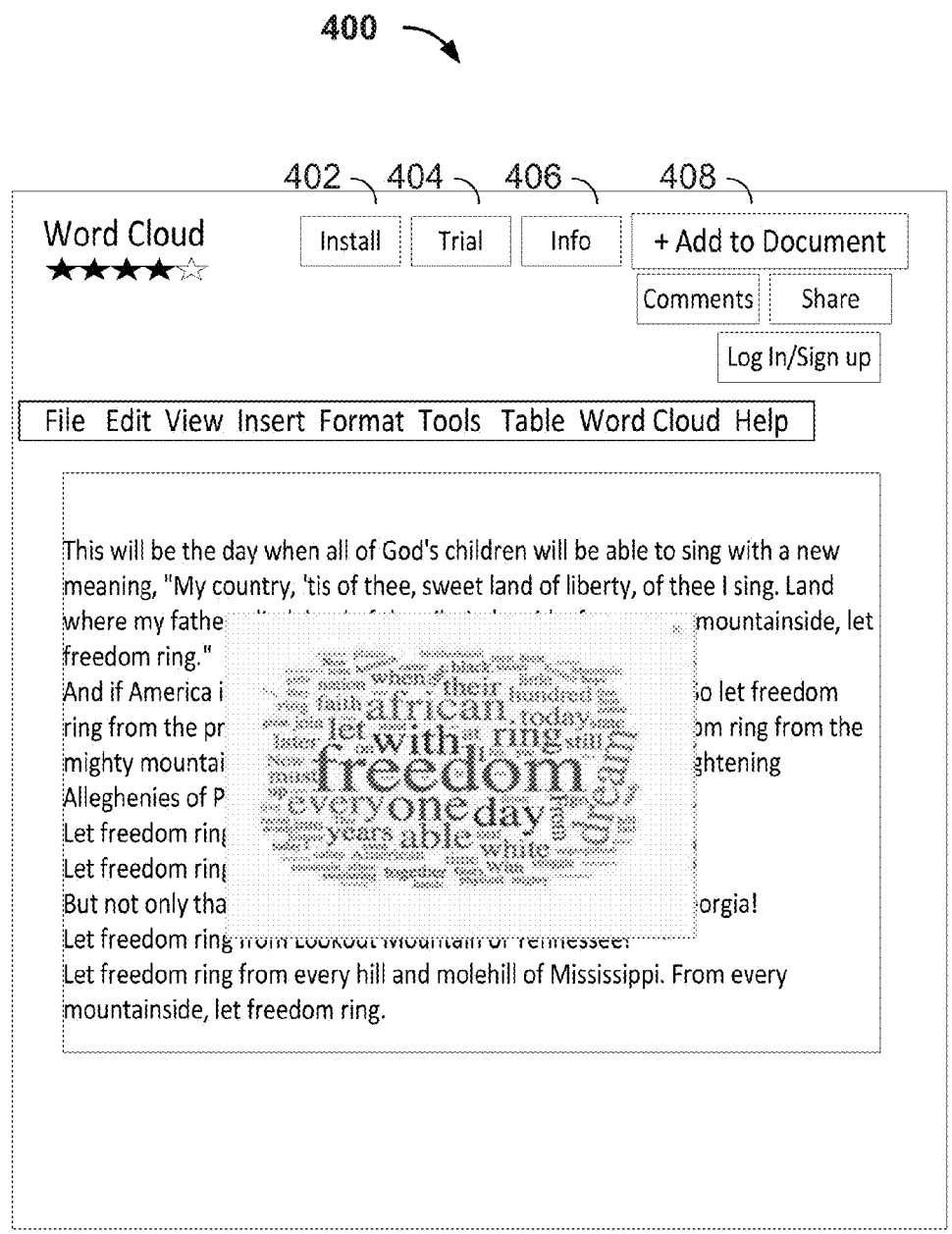
FIG. 4 shows a user interface for accessing a modular application in accordance with an implementation as described herein.

FIG. 4 shows a modular application start page 400 that is displayed by the cloud computing service when the user requests access to the modular application, for example, by selecting the link 304a in the search results on FIG. 3. The modular application start page may be provided in a browser on a user's client device. The start page can also be overlaid over an existing cloud document, in the case that the user is already working on a cloud-based file. The start page 400 may be implemented in Javascript or any other browser compatible language. The design and layout of the user interface 400 is not limited to what is shown in FIG. 4. As shown in FIG. 4, a modular application for Word Cloud may be shown with its available features. For example, Word Cloud is shown with a document and an overlay of a word cloud using words from the document. Options are available in FIG. 4 for the user to interact with the modular application. As shown, the user can select to install the modular application 402 (e.g., to a user device, or to a user cloud account), perform a trial 404, obtain more information 406 or add the modular application to a document 408 (or file) using the cloud computing service. Selecting option 408 to create a document will cause the cloud computing service to provide a new document to the user as well as initiate a sign up process for the cloud computing service.

FIGS. 3-4 show that a user can search and access a modular application for a cloud computing service without prior knowledge or use of the cloud computing service. The search page 300 may be provided by any search engine, online store or application store. Start page 400 may be provided as an independent web page so that users do not have to access the cloud computing service to interact with the modular application. In this scenario, a log in for the cloud computing service may be provided so that the cloud computing service can offer the user relevant options for using the modular application.

Figure 5:
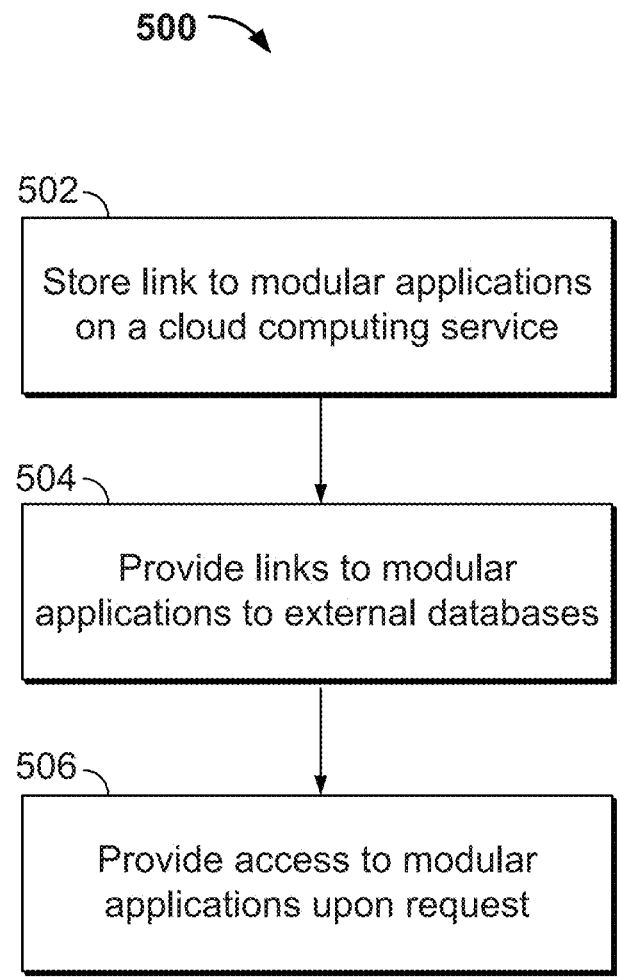
FIG. 5 shows a method for accessing modular applications for use within cloud-based files in accordance with an implementation as described herein.

Methods are now discussed for providing users the ability to access and use modular applications within cloud-based files stored on a cloud computing service. FIG. 5 illustrates a method 500 for providing modular applications to a user. Method 500 includes storing links to modular application on a cloud computing service, providing links to modular applications to external databases, and providing access to modular applications upon request. Method 500 may be performed on one or more servers that collectively provide a cloud computing service, such as cloud computing service 102 in FIG. 1 or cloud computing service 202 in FIG. 2.

Method 500 begins when a cloud computing service stores links to modular applications, shown at 502. The links to modular applications may include application information as well as URLs that may be stored in a data store on the cloud computing service. The links may lead to cloud based storage for the modular application or to an external service that provides the modular application. The link may also lead to a start page (independent web page, or to a cloud-based page) for the modular application. The modular applications are designed to be usable within cloud based files, including collaborative documents, to add more functionality to a collaborative document editing application. Examples of modular applications for use within the collaborative document include word cloud applications, mail merging applications, bibliography applications, chart and graph applications, plagiarism detection applications, document signature applications, facsimile applications, and applications that retrieve information from the Internet to display within the document. The modular applications may be written in Javascript and use the API of the file editing application to add functionality and additional user interface elements. The modular applications may be developed by the cloud computing service or by third-party developers. The modular applications are available for any user to use within a cloud file, and may be free or available for a fee. The links may be made available to third party and external databases, as shown at 504. For example, the links may be available on the internet for including in general search engine results. The links and modular applications may also be included in an application store or online store database.

The cloud computing service will provide access to the modular applications using the links, upon request, as shown at 506. A user may search for a modular application in an application store and obtain one or more results. When the user selects the result, the user will be linked to the modular application by access to the link provided by the cloud computing service. In general, the user will be sent to a modular application start page which will include options for interacting with the modular application.

Figure 6:
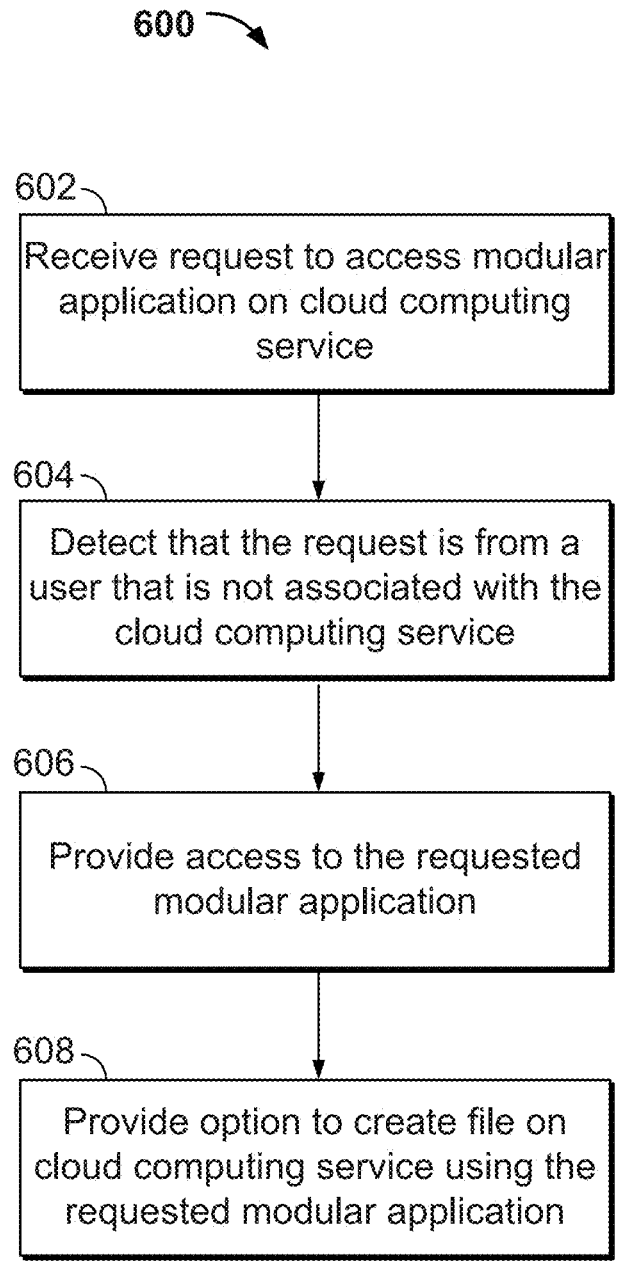
FIG. 6 shows another method for accessing modular applications for use within cloud-based files in accordance with an implementation as described herein.

When the user selects the modular application link, the cloud computing service will determine how to present the modular application based on the requesting source. Methods are now discussed for providing users the ability to access and use modular applications within cloud-based files. FIG. 6 illustrates a method 600 for providing modular applications for use with a cloud computing service for a user that is not associated with the cloud computing service. Method 600 includes receiving a request to access a modular application on a cloud computing service, detecting that the request is from a user that is not associated with the cloud computing service, providing access to the requested modular application and providing an option to create a file on the cloud computing service using the requested modular application. Method 600 may be performed on one or more servers that collectively provide a cloud computing service, such as cloud computing service 102 in FIG. 1 or cloud computing service 202 in FIG. 2.

Method 600 begins when a cloud computing service receives a request to access a modular application on a cloud computing service, shown at 602. The request may be received from a user by selecting a link for the modular application obtained in a search interface or an application store which causes the user to link to a start page that is stored by the cloud computing service. The user may provide certain identifying information to the cloud computing service that the cloud computing service may use to determine whether the user is associated with the cloud computing service, by for example, comparing the user information with a subscriber database of the cloud computing service. As shown at 604, the cloud computing service may detect that the user is not associated with the cloud computing service. This detection may be because a subscribing user refuses to share any identifying information at that time, or that the user's identifying information does not match any known users of the cloud computing system. The cloud computing service may provide access to the user to the requested modular application, as shown at 606 by linking the user to a start page or other application page. Options may be provided to the user to create a cloud-based file using the requested modular application, as shown at 608. The cloud computing service may provide an option on the modular application start page or application interface that allows the user to create a new cloud file using the modular application. Existing users of the cloud computing service may also be provided with options to use the modular application with new or existing user files. Thus, method 600 provides a way for users to interact with a new modular application without prior use of a cloud-based service.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for providing modular applications for use within a cloud-based file, the method comprising:
storing, on a cloud computing service, a link to a modular application configured to be used to edit a cloud-based file;
receiving, from a user, a request to access the link to the modular application;
determining whether the user is associated with the cloud computing service;
providing access to the requested modular application; and
in response to determining that the user is not associated with the cloud computing service, providing to the user at least two options to interact with the requested modular application and a cloud-based file, wherein a first of the at least two options includes an option for the user to become associated with the cloud computing service.

2. The method of claim 1 wherein one of the at least two options comprises an option to create a first cloud-based file using the modular application.

3. The method of claim 1 wherein one of the at least two options comprises an option for a trial of the requested modular application.

4. The method of claim 2 further comprising, if the user is determined to be associated with the cloud computing service, providing a user authentication procedure for the cloud computing service.

5. The method of claim 2 further comprising, if the user is determined to not be associated with the cloud computing service, providing a user introduction to the cloud computing service.

6. The method of claim 2 further comprising activating an installation of an application to create the first cloud-based file.

7. The method of claim 1, further comprising providing the link to the modular application to a searchable database.

8. The method of claim 1, further comprising providing the link to the modular application to an application store.

9. A system for providing modular applications for use within a cloud-based file, the system comprising:
   a plurality of client computers; and
   a server configured to:
      communicate with the plurality of client computers;
      store, on a cloud computing service, a link to a modular application configured to a cloud-based file;
      receive a user-initiated request to access the link to the modular application from one of the plurality of client computers;
      determine whether the user initiating the request is associated with the cloud computing service; and
      in response to determining that the user is not associated with the cloud computing service, provide at least two options to interact with the requested modular application and a cloud-based file, wherein a first of the at least two options includes an option for the user to become associated with the cloud computing service.

10. The system of claim 9 wherein one of the at least two options comprises an option to create a first cloud-based file using the modular application.

11. The system of claim 9 wherein one of the at least two options comprises an option for a trial of the requested modular application.

12. The system of claim 10 wherein the server is further configured to provide a user authentication procedure for the cloud computing service if the user initiating the request is determined to be associated with the cloud computing service.

13. The system of claim 10 wherein the server is further configured in response to determining that the user is not associated with the cloud computing service to provide a user introduction to the cloud computing service.

14. The system of claim 10 wherein the server is further configured to activate an installation of an application to create the first cloud-based file.

15. The system of claim 9 wherein the server is further configured to provide the link to the modular application to a searchable database.

16. The system of claim 9 wherein the server is further configured to provide the link to the modular application to an application store.

\* \* \* \* \*